3,286,258

RADAR APPARATUS

Jack Gordon McQueen, Cheadle Hulme, England, assignor to Associated Electrical Industries Limited, London, England, a British company Filed Mar. 1, 1965, Ser. No. 436,159
Claims priority, application Great Britain, Mar. 6, 1964, 9,706/64
8 Claims. (Cl. 343—17.1)

This invention relates to radar apparatus and has an important application inter alia in stacked beam radar for detecting aerial targets.

In stacked beam radar equipment there is an aerial assembly producing a number of beams directed at different angles of elevation so that by rotating or oscillating the assembly about a vertical axis, a large volume can be swept.

In detecting aerial targets it is important to distinguish actual targets from random signals. In PPI and similar displays the same target will be reproduced during several successive radar traces as the beam sweeps angularly; this distinguishes actual targets from noise and other random signals which usually provide peaks at different positions on the PPI during successive traces. This property of target signals gives them a quality on a plan position display which assists the operator in making a decision as to the likelihood of a particular bright spot representing a true target. In apparatus using computing apparatus instead of a display the waveform at the detector output, consisting of noise and signals, is applied to a voltage threshold circuit. Any part of the waveform which exceeds the threshold voltage is referred to as a "success". If, at a particular instant in time, the waveform remains below the threshold, there is said to be a "failure" at that instant.

This process is termed an extraction process. It commences with a "success" at a particular range on a particular radar trace indicating that the beam is starting to sweep through a possible target.

During the subsequent radar traces the same range element is investigated as the aerial scans through the target.

Provided an adequate number of successes has been reached, an output plot is recorded when the number of failures reaches a predetermined value indicating that the beam has swept through the target.

It will be appreciated that the indication that the target is a correct one is not obtained until the trace has swept past the actual target so that it is necessary to make an azimuthal correction on the display to obtain the correct azimuth of the target. However, the azimuth arc over which signals are received from a target will vary with the target's strength so that if a constant angular azimuthal correction is made for all target strengths, errors will be introduced.

An object of the invention is to provide an improved arrangement which minimises or substantially avoids the above mentioned errors.

According to the present invention radar equipment including apparatus for transmitting pulses and receiving echo signals at successive angular positions over an angular sweep comprises means whereby when an echo signal above a predetermined strength is received a main counting operation is started and continued until reliable signals at the same range cease, means whereby a compensating count immediately follows the main count which compensating count has a length bearing an inverse relationship to the main count and means whereby a backward angular correction is then made to determine the true angular position of the target in the arc swept during the counting operations.

According to one embodiment the equipment includes selective extractor apparatus wherein in addition to echo signals (successes) being counted during successive traces, together with failures following the last success, there is also a total count of traces from the time of the first success. When the failure count reaches a predetermined value (and if the success count is adequate) the total count is halved and a compensating count is then continued from the halved count on successive radar traces until a predetermined value is reached at which instant the target plot is fed out of the automatic extractor and a constant azimuthal lag correction is then applied to the display and/or to the apparatus used for digital coding of the azimuthal bearing of the target.

It will be appreciated that by halving the total count and then making a compensating count up to a predetermined value the time occupied in the compensating count will be shorter for a strong target than it will be for a weak target so that, when the backward azimuthal correction is applied, substantially the same azimuth will be obtained for weak targets as for strong targets at the same bearing.

An alternative process consisting in continuing the compensating count from the figure reached in the main count but in causing the count to increase by steps of 2 instead of by steps of 1 until a predetermined overall count is reached, i.e. to make a count of 2 for each trace.

As above mentioned, the invention has an important application in radar equipment in which the above mentioned operation would be carried out for successive ranges and there will either be a set of storage devices for each such range, or alternatively a set of computer stores will be allocated to any range element at which a success occurs.

As above mentioned, the invention has an important application in multiple beam systems of the kind in which an aerial rotating about a vertical axis radiates a number of beams at different angles of elevation. If at a particular bearing position, noise peaks from all the beams are counted as successes, considerable loss in performance will occur. Therefore, according to a further feature of the invention, successes are counted for the particular beam contributing the first success and, independently for the two immediately adjacent beams.

The failure count covers all three beams.

In order further to reduce the effect of false alarms occurring in beams other than the beam containing the target, means are provided to prevent the continued reservation of a store for a beam which has contributed a false alarm at a given range. To this end means are included whereby if a given range store contains one success only, an incoming signal in a beam other than the beam concerned or one of the immediately adjacent beams is allowed to overwrite the contents of the store.

In order that the invention may be more clearly understood reference will now be made to the accompanying drawings, in which.

Figure 6:
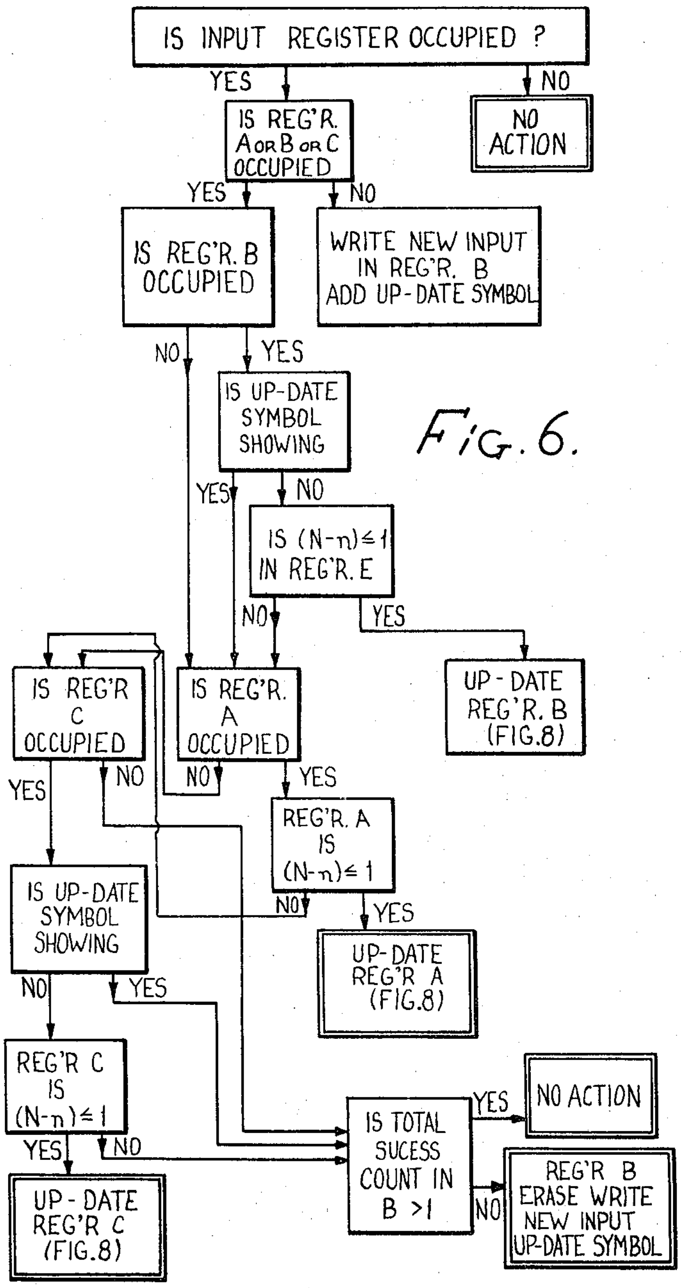
FIG. 6 shows the echo associator of FIG. 4 in greater detail.
Figure 8:
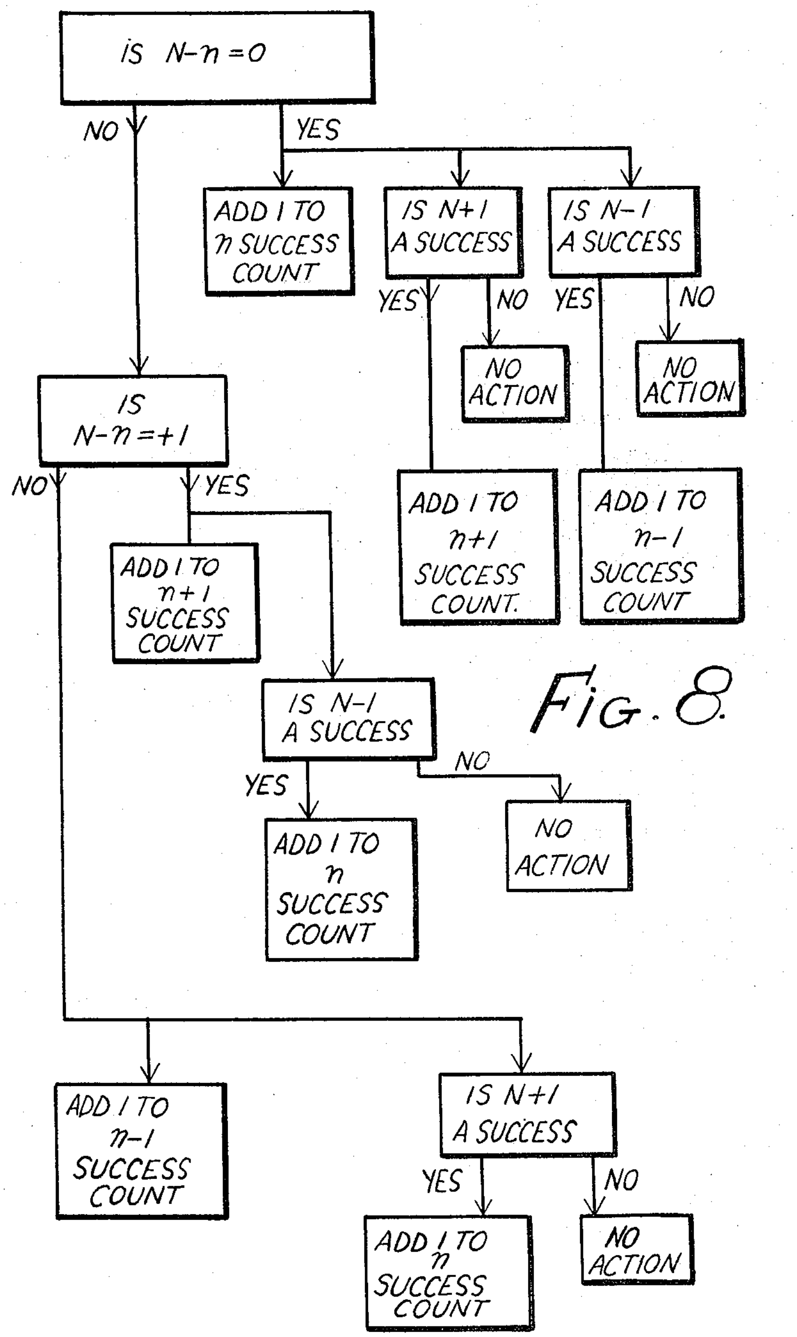

FIG. 8 explains in block form the operation of the update process of FIG. 6.

Figure 7:
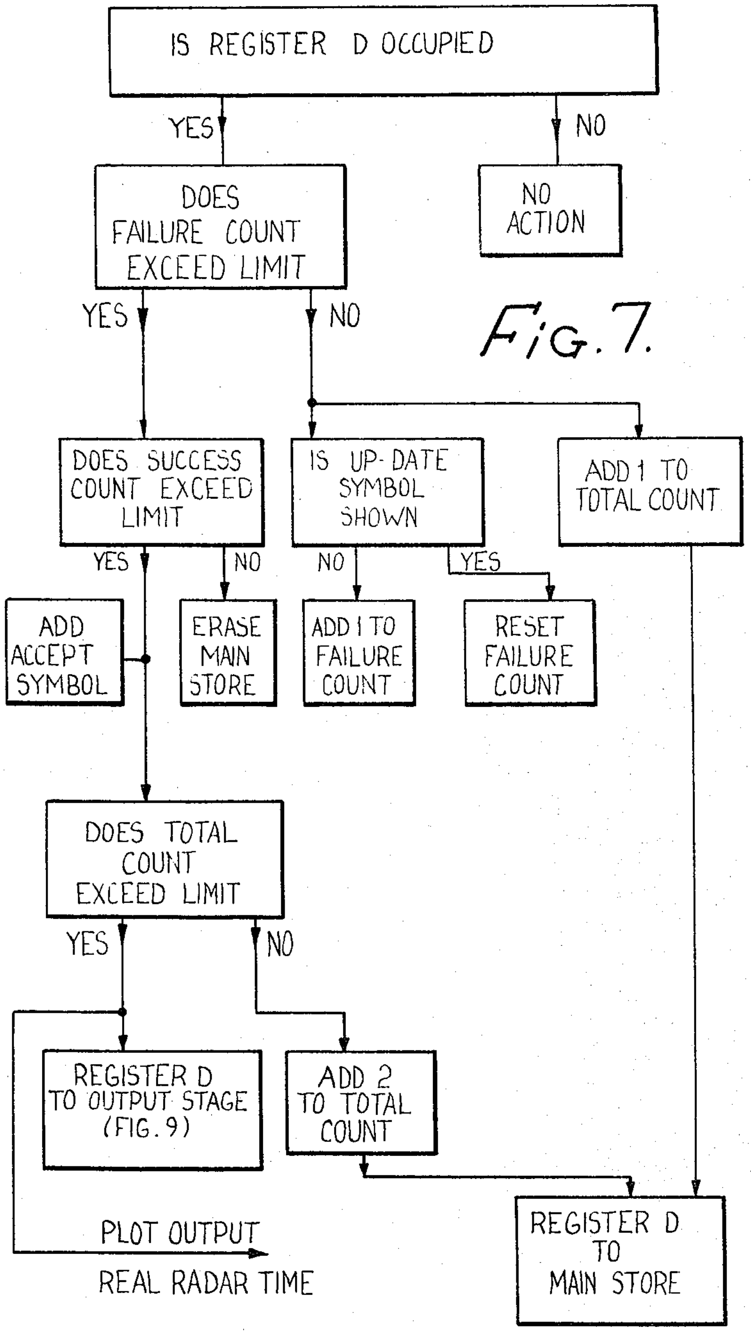
FIG. 7 shows the output routine of FIG. 4 in greater detail.
Figure 9:
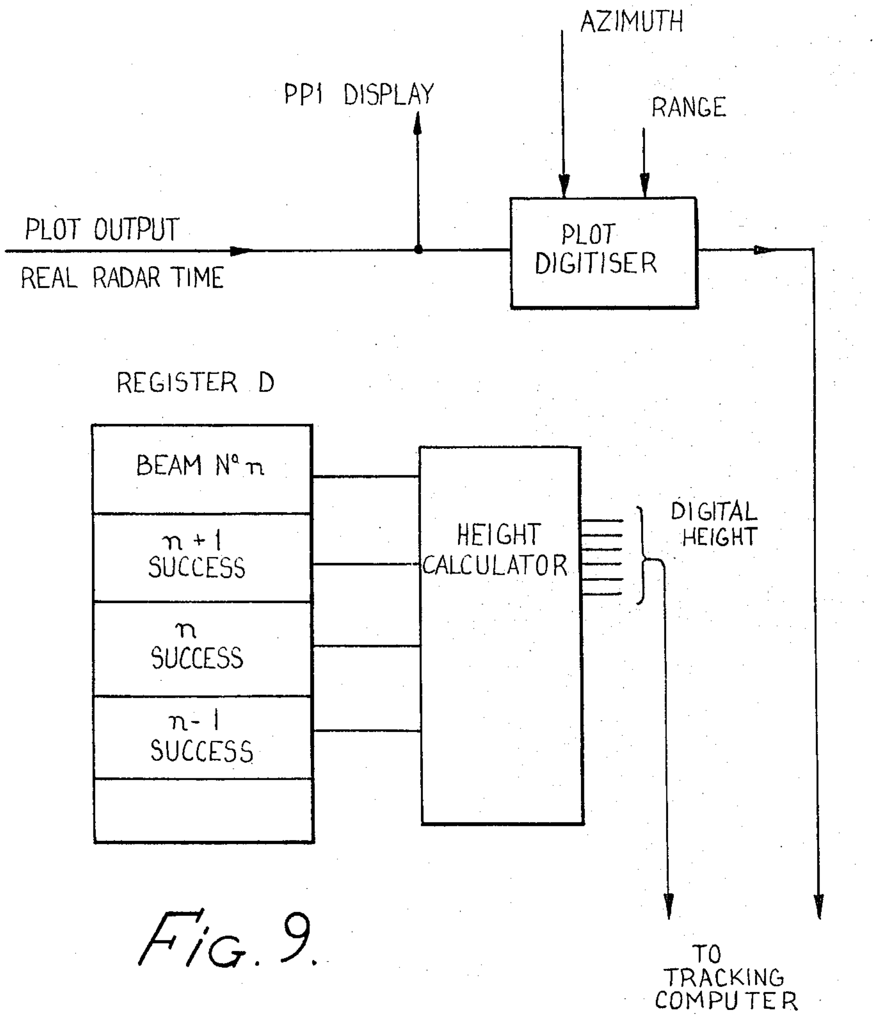

FIG. 9 similarly explains the operation of the output stage referred to in FIG. 7.

As is well known, in a radar receiver there is a considerable amount of noise and interference, and the main purpose of the extractor is to distinguish actual targets from noise and interference.

The operation of an extractor is based on that of a binary integrator. In binary integration a threshold level of waveform is set up, above which level there is a probability, though not a certainty, of a signal. Whenever the waveform exceeds the threshold, either due to a signal or to noise, an echo pulse of standard width and height is produced. If, during a succession of traces, as the beam is swept in azimuth an echo occurs at the same range during a number of traces, i.e. over a large arc, an output signal (a plot) is produced. In such a system it is necessary to determine the exact position of the target in the arc over which signals are received and this is liable to produce azimuth errors unless provision is made for avoiding such errors.

Figure 1:
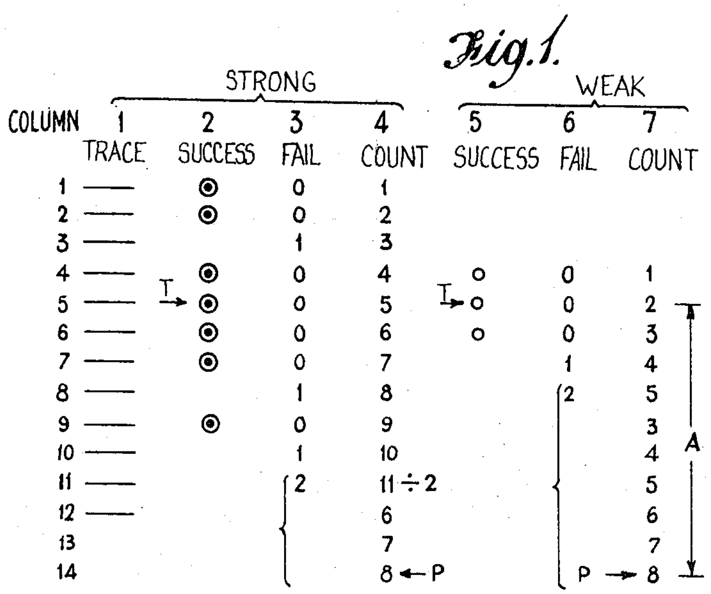
FIG. 1 is a graphical drawing explaining the operation of an extractor for a single beam aerial.

In FIG. 1, the horizontal lines in column 1 indicate a number of successive radar traces occurring in different angular positions as the beam is swept in azimuth, in column 2 a bull's eye indicates that a strong echo signal is produced during the trace concerned, in column 3 a one indicates a failure, i.e. a trace in which there is no strong echo signal and column 4 is the total trace count. The trace count shown in column 4 is started when an echo signal above the predetermined minimum level is received and after this commencement, if, during any trace no strong echo signal is received, a failure is recorded as shown in column 3. In the example shown it will be seen that there are strong echo signals during the first two traces, but a failure, i.e. no strong echo signal during the third trace indicated by the 1 in column 3. Similarly, there are failures during the eighth, tenth and eleventh traces. Since there are two successive failures during the tenth and eleventh traces the number 2 is recorded in the failure count in column 3 for number eleven trace and, assuming that this number of successive failures is taken as an indication that the trace has swept through the target, it will be necessary to apply an azimuth correction in order to find the true azimuth of the target. The target will of course be at the centre of the arc swept by the traces during the trace count in which the same echo signal was received so that the correction will consist in counting back half the number of traces which were swept during the count. It is assumed that this was the direction of the aerial during trace No. 5 as indicated by arrow to the left of column 2. These are the conditions for strong echo signals.

Columns 5, 6, and 7 correspond to columns 2, 3, and 4 but show the conditions arising for weak echo signals which of course occur over a smaller arc. It is assumed that the weak echo signals occur during the radar traces 4, 5 and 6 so that the true azimuth of the target is the same as for the previous case, i.e. it is the direction of the aerial during radar trace 5. However, since the first of the weak signals occurs during radar trace 4 the total count of traces will start from this trace and failures will commence from trace 7 reaching the critical value of two failures in trace 8. Now it is clear from the figure that a count back correction of only three radar traces is needed to produce the true target azimuth when the failure trace count of 2 is reached with the weak signal columns 5, 6 and 7. On the other hand, for the strong signal conditions explained in connection with columns 2, 3 and 4 the critical failure conditions are reached at radar trace 11 and a count back correction equivalent to six radar traces is required to obtain a true target azimuth. It follows therefore that if the apparatus is designed to give a constant count back azimuth correction for all strengths of signals then errors will occur, depending upon the strength of the signals. In accordance with the present invention this error is avoided by a procedure referred to herein as an acceptance routine and according to which, when the critical failure count is reached the total trace count is divided and a compensating count of traces continued up to a limiting value. In the example shown the main trace count 11 is divided by 2, (i.e. 6), and a compensating count is then made starting from trace 6 and continuing until a limiting value is reached whereupon the plot is fed out and a fixed count back azimuth correction is made. In the example shown the limiting value for the compensating trace count is 8 and the backward azimuth correction is 9 radar traces. Thus, for strong echo signals the arc over which signals will be received will be large and critical failure trace count (i.e. two successive failures) occurs at a greater angular distance and hence a larger count after the true azimuth has been passed but the compensating trace count is shorter. On the other hand, for weak echo signals the arc over which signals will be received will be small, the critical failure count therefore occurs at a smaller angular distance after the true azimuth, but the compensating trace count is longer. This is because the divided trace count is smaller than in the case of a strong signal and hence a longer compensating count is necessary to reach the limiting value. It is thus possible to employ a constant azimuth correction for all signal strengths.

It will be appreciated that instead of dividing the main trace count (e.g. by two) before carrying out the compensating count the compensating count could be carried out at a different rate continuing from the value reached in the main count.

Thus, in the extended count only alternate traces could be counted until a limiting count number is reached which limiting number is constant.

It will be appreciated that the trace counts will be recorded by storage cells and that there will be a set of such storage cells for each range. Thus the operation could be carried out simultaneously in a number of different ranges though equipment would only be concerned with one target in each range.

Figure 2:
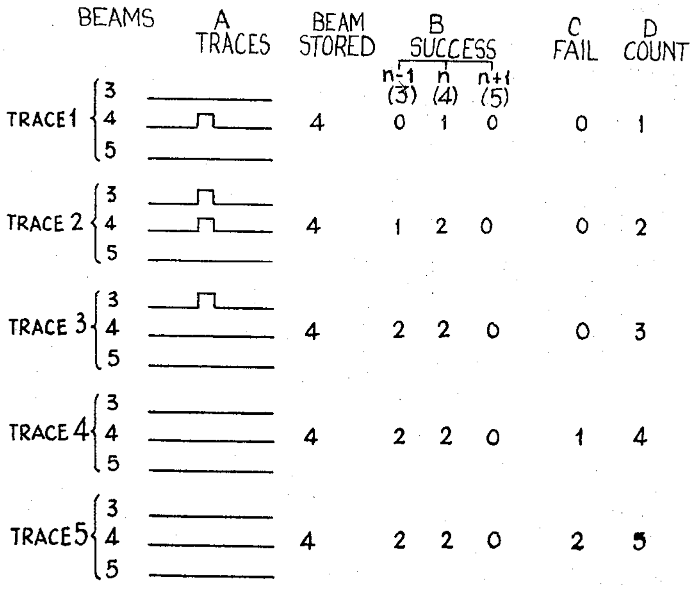
FIG. 2 is a similar figure explaining the modification of the extractor for a multiple beam fan aerial.

FIG. 2 illustrates graphically the application of the invention to a stacked beam radar equipment, i.e. in which there are a number of aerials each transmitting and receiving signals in the same azimuthal direction but at different angles of elevation. Column A represents the received signals in three adjacent beams on successive radar traces, column beam stored the identifying number of the beam first contributing a success at the given range, column 13 the success count in beams $n-1$, $n$ and $n+1$, corresponding to the adjacent beams 3, 4 and 5 column C the failure count and column D the total count. It will be appreciated that with such an arrangement the first echo signal may occur in more than one adjacent beam but for purposes of explanation it will be assumed that during trace 1 a signal is received in beam No. 4 only. During trace No. 2 this signal is received by both beams 3 and 4 and during trace No. 3 it is received by beam 3 only, thereafter it ceases. In the success count column B the $n$ sub column in this case is beam 4, the $n-1$ column is beam 3, the $n+1$ column is beam 5. During trace 1 a signal is received by beam 4 but no signal by the other two. During trace 2 it is again received by beam 4 giving a count of two in its beam and a count of 1 for beam 3. In trace 3 there is a count of 2 for beams 3 and 4; thereafter the success count remains constant but the failure count is shown in column C, commences at trace 4 and reaches the critical value of 2 at trace 5. Thereafter the procedure outlined in connection with FIG. 1 would be followed.

Figure 3A:
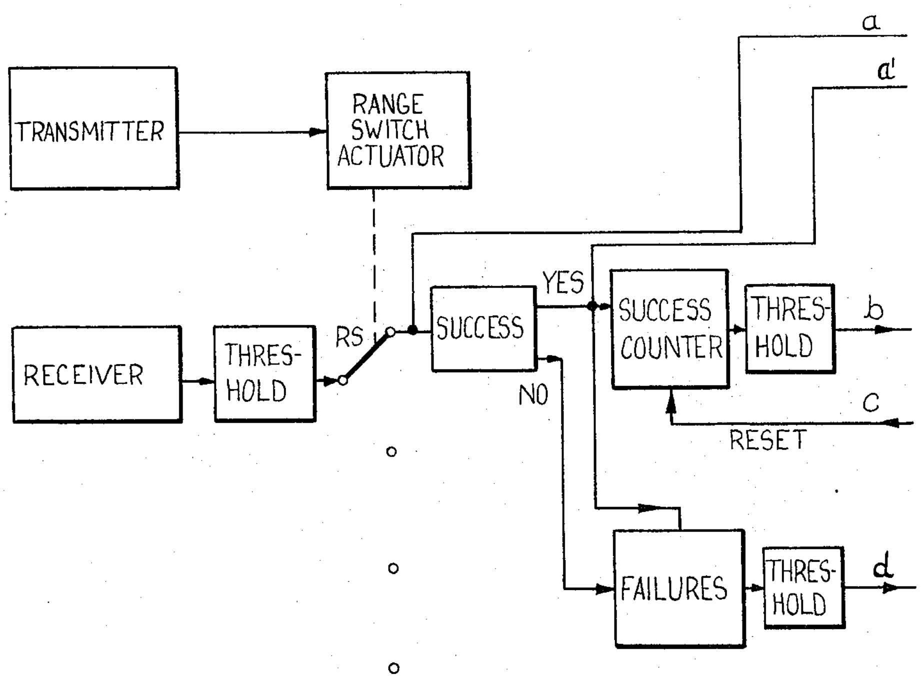
FIGS. 3A and 3B are block flow diagrams showing how the extractor would be connected in a radar system.
Figure 3B:
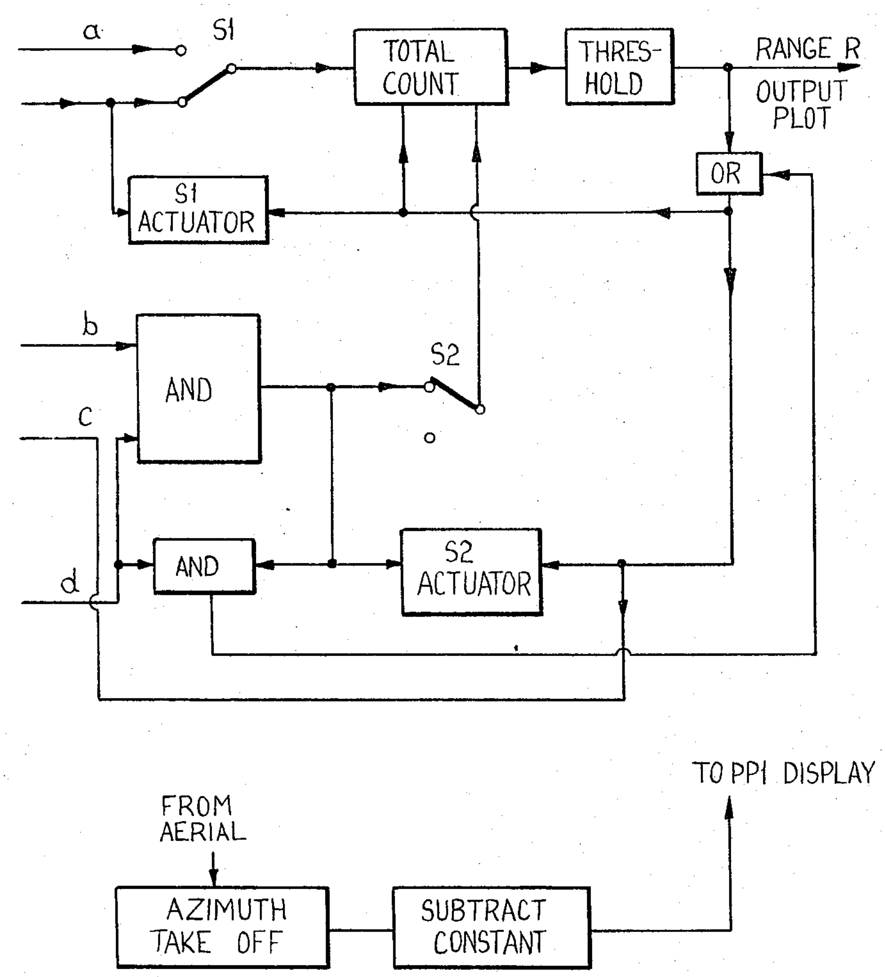

FIGS. 3A and 3B show in block form the general layout of apparatus for carrying out the process illustrated in FIG. 1. Echo signals from the receiver are passed to a threshold circuit and then through a range switch RS actuated by the transmitter which, during the radar cycle, i.e. the interval following each transmitted pulse, connects the threshold circuit sequentially to a number of separate circuits, each circuit being associated with a particular range. FIGS. 3A and 3B show the apparatus for one range only, indicated as range R, and the apparatus to the right of the range switch RS will be repeated for each range. The signals from the range switch RS are applied to a circuit labelled "Success." If a signal is received an output will appear at the YES terminal and if no signal is received an output will appear at the NO terminal. If there is a signal at the YES terminal this will pass to the success counter which will increase its count by 1.

The first signal obtained at the YES terminal of the success circuit will also be passed through the switch S1 to trigger the total count circuit. This signal will also drive the S1 actuator circuit which is a bistable circuit and will switch over S1 so that signals will now pass direct from the input to the success circuit to the total count circuit. Thus, once a success has been received, the total count circuit will receive a signal during each radar cycle independently of whether or not this carries an echo signal at the particular range. This will continue until the plot is fed out or until the decision "false alarm" is made.

It will be appreciated that the operation described occurs whilst the radar beam is moving in bearing through a target. When its bearing has moved past the target, failures will occur continuously and each of these will produce an output at the NO terminal and will be passed to the failure counter. When the failure count reaches the limiting value which, in the example above described was 2, indicating that the beam has moved past the target, an output will appear at the failure threshold circuit and this will be passed to the AND gate. Provided the success counter has reached a minimum value indicative of an actual target, the threshold circuit from the success counter will also pass a signal to the AND gate and the output from the AND gate will pass through switch S2 to halve the count in the total count circuit. The total count will then start to make its compensating count and when this has reached the limiting value an output plot will be made. At the same time the bearing reference in the display or tracking computer will be set back angularly by a fixed amount so that the plot will occur at the true target bearing.

In order that the halving operation should be operated once only and not during the compensating count, switch 2 is actuated from the first output from the AND gate to disconnect the output from the AND gate to the halving input of the total count.

Once the output plot has been obtained it is necessary to reset the bistable actuators for switches S1 and S2 as well as the success count and total count. This is carried out by a connection from the output plot to an OR gate from which connections are made to the two bistable actuators, the success count and the total count.

In order to deal with the situation where a success count is due to a false alarm, a test is made in the AND gate to observe the presence of a failure threshold output without a simultaneous success count output. The output from the AND gate is fed through the OR gate referred to above and resets the success count and total count to zero as well as resetting the two bistable switch actuators.

The failure count is always reset to zero when there is a YES input to the success counter so that the failure count always starts from the last success.

Figure 4:
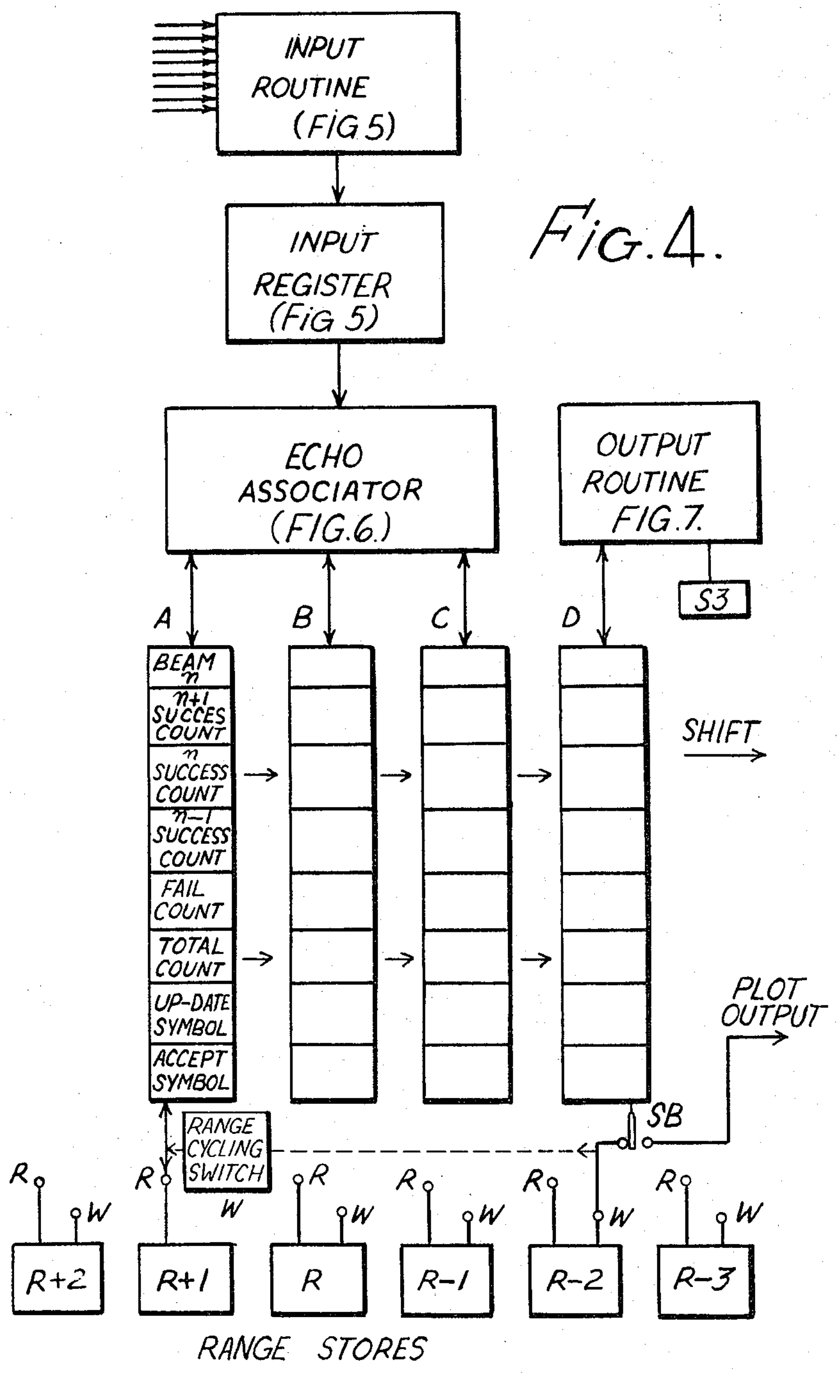
FIG. 4 shows in block form the general layout of a more complete equipment.

FIGS. 3A and 3B show the general layout for a single beam radar. However, in the case of a stacked beam aerial such as has been described in connection with FIG. 2, additional circuitry is required and FIG. 4 shows the general layout of apparatus for use in connection with a stacked beam aerial. Each beam will have its own receiver and these will each feed a separate input to the rectangle marked INPUT ROUTINE. As will be described in connection with FIG. 5 this input routine indicates which of the beams contains the strongest signal at a particular range and also whether the two adjacent beams are providing any signals. The information derived is passed to the input register. The input register feeds information to the logic circuit laballed "Echo Associator" which compares the instantaneous incoming information with information previously received and stored for the same range. At the foot of FIG. 4 is shown a series of stores and there is one of these stores for each range.

It will be noticed that between the logic circuit and the range stores R+2, R+1 . . . there are four shift registers and at the time instant shown the left hand register A is connected to the READ terminal of the R+1 store whilst the right hand shift register D is connected to the WRITE terminal of the R−2 store. The information at the R+1 store will be read into the left hand shift register and when the next clock pulse arrives this information will be transferred from the first register A to the second register B. At the next clock pulse this will again be transferred to register C and then to register D. Since the A and D registers are also connected successively to the range stores by means of a range cycling switch, it follows that after four clock pulse intervals the register D will be connected through the switch S3 to the WRITE terminal of range store R+1 so that the information which was previously in this store will either be written back into it, modified in accordance with any fresh information received from the echo associator circuit, or will be passed to the plot output. This decison is controlled by the output routine circuit.

The information stored in the range stores and in the four shift registers is such as is required to carry out the logical processes to be described with reference to FIGS. 6 and 7. This information is as follows:

Beam *n*: the number of the beam contributing the first success at the particular range.

*n*+1 success count: the number of successes to date in the beam above beam *n*.

*n* success count: the number of successes to date in beam *n*.

*n*−1 success count: the number of successes to date in the beam below *n*.

Failure count: the number of failures since the last success in any of the three beams.

Total count: the number of radar cycles since the commencement of the process and modified in accordance with the halving procedure already described.

Up-date symbol: a digit which is used to indicate that the contents of a register have been associated with an incoming signal during the present radar cycle.

Accept symbol: a digit which indicates that the presence of a plot at the particular range has been established and that the compensating count is progressing.

Figure 5A:
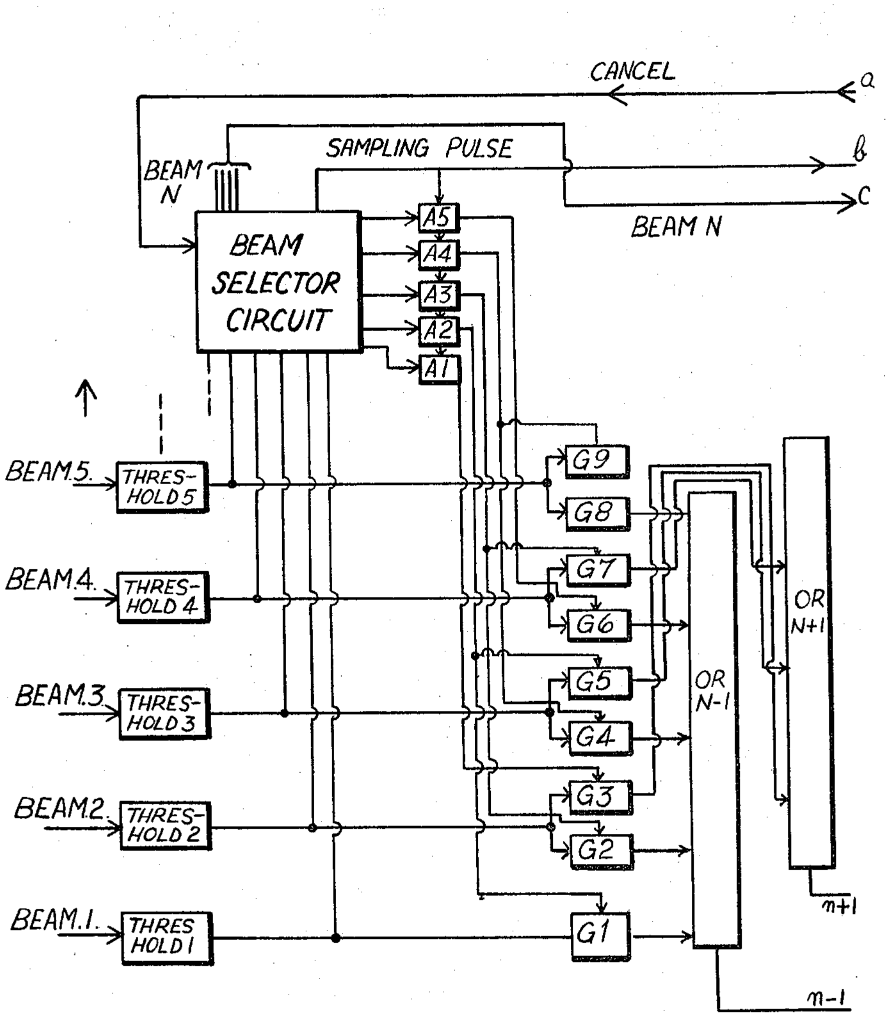
FIGS. 5A and 5B (which are flow diagrams) show in greater detail the input routine section of FIG. 4.
Figure 5B:
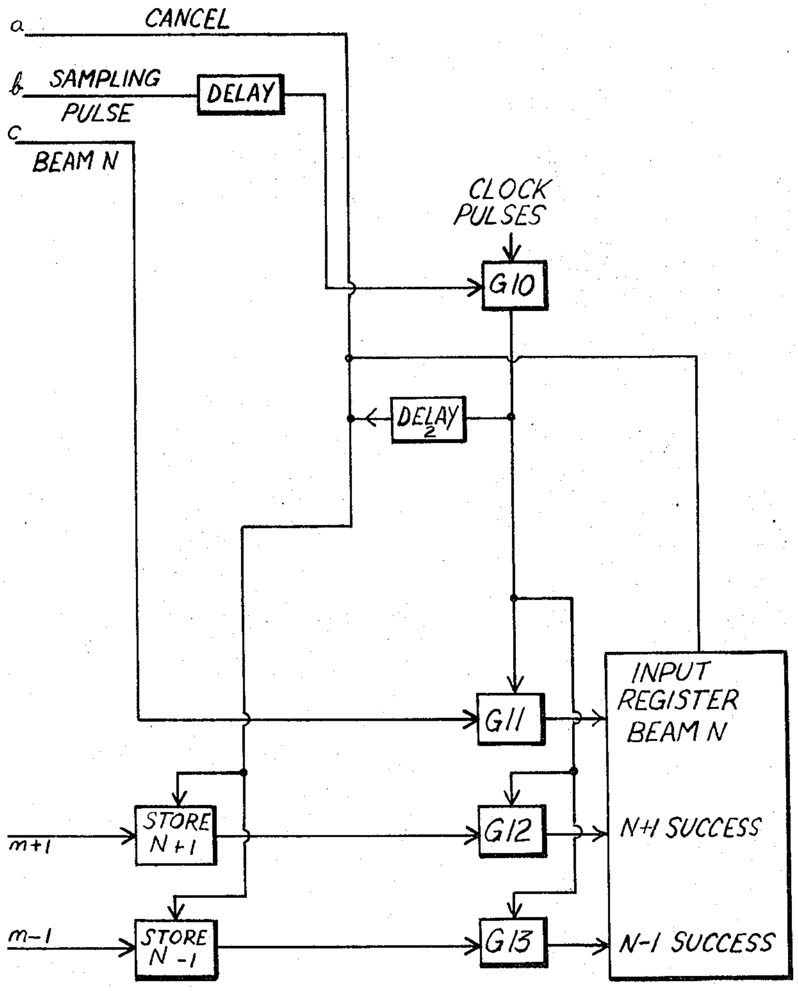

FIGS. 5A and 5B show the input routine indicated by the rectangle at the top of FIG. 4. Signals from each of the beams pass to the appropriate threshold circuit shown on the left of FIG. 5A. FIG. 5A shows the bottom five beams only of a stacked beam radar which normally would have appreciably none. The output signals from the threshold circuits are fed to a beam selector circuit which determines which of the input lines contributes a signal. Once a signal appears, the decision made by the beam selector circuit as to which beam is selected is held for just over one radar pulse length until the beam selector circuit receives a cancellation, as will be described later. The decision is a unique one which means that if two pulses appear simultaneously or almost simultaneously on more than one line a single line only at the output of the beam selector circuit is energised.

The identifying number of the beam so selected is registered in binary digital form and is fed along the line labelled BEAM N (which in practice represents a bunch of lines) to the gate G11, FIG. 5B, and thence to the input register.

Having identified the beam contributing the signal it is necessary to test the adjacent two beams for the presence or not of signals above the threshold in those two beams. This is carried out by means of a sampling pulse having a width of approximately 1 radar pulse length and generated by the beam selector circuit. This sampling pulse is combined with signals from the beam selector circuit in a series of AND gates marked A1–A5 in FIG. 5A to produce the necessary drives for a series of gates labelled G1 to G9 which in turn feed signals from the beams adjacent to beam N into OR gate combining circuits and thence into stores labelled N+1 and N−1.

For example, if the beam selector circuit registers a success in beam 4 the sampling pulse is allowed to pass through gate A4 and it then opens gate G4 which is thus enabled to pass a beam 3 success signal into the N−1 combiner and store and also opens gate G9 which is thus enabled to pass a beam 5 signal into the N+1 combiner and store.

The input register is used in association with the range stores as previously described in connection with FIG. 4 and the sequencing of information in the input register must therefore be synchronised with the switch sequencing through the range stores of the range cycling switch (FIG. 4). The range switch sequencing is carried out by clock pulses following each other in a regular sequence after each transmitter pulse. The clock pulses are therefore also used to control the timing of the radar input information into the input register.

The sampling pulse from the beam selector circuit is delayed in delay 1 and fed to gate G10 and the next clock pulse is allowed through G10 to operate gates G11, G12 and G13 and thus feed the stored information relating to the input signals to the input register in synchronism with the range store switching.

This information is held in the input register for a time equal to the interval between successive clock pulses, the information being cancelled by the operation of delaying the G10 output in delay 2 and passing the delayed pulse as a resetting signal to the register. This resetting signal is also used to cancel the contents of the beam selector circuit and the stores N+1 and N−1.

From this instant onwards the beam selector circuit is ready to respond to the reception of a new signal.

As described with reference to FIG. 4, one of the main objects of the invention is to enable new input signals to be properly associated with stored information relating to the same range during previous radar cycles. To this end information relating to three ranges is held in registers A, B and C of FIG. 4 where it is available for comparison with the contents of the input register. The reason for making information in three adjacent ranges available is that because of slight timing jitter in the received radar echoes it is possible for an echo to appear in range element R during one radar cycle and in range element R+1 or R−1 during the next. The logical processes now to be described with reference to FIG. 6 permit the association of new information with the existing information in the same and the two adjacent range cells.

The first stage in the echo association process is to observe whether the input register is occupied. If it is not the contents of the registers A, B and C are not changed. If the input register is occupied, the next step is to observe whether any one of the registers A, B or C already contains a signal. If not, the new input is written into register B (this register representing the same range element as the input register) and a symbol is also written in register B indicating that the register has now been up-dated, i.e. adjusted, during the present cycle.

If, however, one of the registers is occupied the next step is to observe whether register B is occupied. If so, it is required to know first whether the up-date symbol is showing, i.e. whether the register has been adjusted. If it is this means that register B has, in the previous range element, been satisfactorily associated with another input signal and should not be disturbed. In this case the operation proceeds as if register B were unoccupied. Provided the up-date symbol is not showing indicating that the register has not been adjusted during the present cycle, the test is made to see whether the beam number $n$ already in store is the same as, or adjacent to, the beam number N of the new input information. If so, association can take place and the up-date routine is carried out in register B as described with reference to FIG. 8. The reason for including the adjacent beam in the test for acceptance is that, particularly in the case of a target midway between two beams, there may be uncertainty as to which of the two beams will be registered in the beam selector circuit of FIG. 5 and therefore a target might register in one or other of two adjacent beams on successive radar cycles.

If the $N-n$ test in register B indicates that the new signal is in a beam which is not adjacent to or is not the same as that whose signal is already stored, the association in register B is not possible and the procedure follows the same routine as if B were unoccupied.

If register A is unoccupied the next test is to observe whether register C is occupied. If so, and if the up-date symbol is not showing, and if the $N-n$ test succeeds, register C is up-dated. If register C is unoccupied or if the up-date symbol is showing, indicating that register C has already been modified during the present cycle, or if the register C signal is due to a remote beam, the logic reverts to a consideration of register B.

In order that a store should not be allowed to be occupied by a false alarm to the detriment of detection of a real target in another beam it is considered advisable that if there is a single success only in a particular range element then if, during a subsequent radar cycle, a signal appears in another non adjacent beam (implying that there is not a repeated success in the stored beam) the stored information should be changed over to the new input. This procedure is carried out in the blocks in the bottom right hand corner of FIG. 6. If the total success count in B is greater than 1 it must not be over-written and the new input is discarded. If, however, the total success count in B is 1 the content of register B is over-written and the up-date symbol added.

When the logic of association has been carried out the content of each register appears in turn in register D in which position the re-cycling and output logic is applied. Referring to FIG. 7, if register D is unoccupied no action is taken. If register D is occupied the test is made as to whether the failure count has reached the required threshold for signal acceptance. If the failure count has not reached the acceptance level the following re-cycling routine is adopted. First, it is observed whether the up-date symbol has been applied (i.e. has the register been adjusted) indicating a success during the present radar cycle. If not, the failure count in register D is increased by 1 whereas if up-dating has taken place the failure count is reset to zero. The total count in the register is increased by 1 and the contents of the register are returned to the main store. If the failure count has exceeded the limit, this can be due to the radar beam having passed through a target, or alternatively it can be due to the whole process having been started by a false alarm. The test is therefore made as to whether the success count in any of the three beams has reached a predetermined limit. If it has not, a false alarm is assumed and the content of the main store at that range element is cancelled. If, however, the success count has reached its threshold an acceptance symbol is added indicating that a target plot has been recognised and that the information is to be held in that range store until the total count limit is reached. The test is then made as to whether the total count has reached the predetermined limit. If it has not, the count is increased by two (which is the alternative method of producing a compensating count for azimuth correction). The content of register D is then returned to the main store.

If the total count has reached its limit the content of register D is fed to the output stage described with reference to FIG. 9. The time instant at which this occurs is in fact the real radar time of that output plot.

When the content of register D is fed to the output stage the main store at that range element is cancelled.

When the logic of FIG. 6 leads to the up-dating of a particular register the routine is as will now be described with reference to FIG. 8. If the stored beam number $n$ is the same as the incoming beam number N, i.e. if $N-n$ is equal to 0, the $n$ success count in the register is increased by 1. If there is also a success in beam $N+1$ the $n+1$ success count is increased by 1 and similarly if there is a success in beam $N-1$ the $n-1$ success count in the register is increased by 1. If $N-n$ is equal to $+1$ then beam N in the input register is the same as beam $n+1$ in the shift register. Therefore the $n+1$ success count is increased by one. If there is also a success in beam $N-1$ in the input register the $n$ success count in the shift register is increased by 1. If $N-n$ is equal neither to 0 nor to $+1$ it follows that beam N in the input register is the same as beam $n-1$ in the shift register. The success count for that beam is therefore increased by 1. If there is also a success in the input register in beam $N+1$ the $n$ success count in the shift register is increased by 1.

The final output routine is shown in FIG. 9. The real radar time plot output can be fed directly to a plan position display and also to a plot digitiser. Digital azimuth information is fed to the digitiser from the radar aerial and digital range information is fed from a count which starts from zero at the instant of each radar transmission. These two digital quantities are sampled by the real radar time plot output, thus providing digital range and bearing for feeding to a buffer store and thence to a tracking computer. The contents of register D are used to determine additional information relating to the plot. The total success count may be used as an indication of the signal strength of the target and therefore the credibility of the plot. The comparative number of successes in three adjacent beams together with the number of the centre beam of the three can be used to determine the elevation and from that the height of the target. The relationship used in the height calculator is as follows. The angle of elevation of the target relative to the crossover point between the two "strongest" beams of the three is proportional to the difference between the squares of the successes in those two beams. The sine of the elevation angle is multiplied by the range in the height calculator and the earth curvature correction added. Height in digital form is fed out and associated with the digital plot for use in a tracking computer.

What I claim is:

1. Radar equipment including apparatus for transmitting pulses and receiving echo signals at successive angular positions over an angular sweep, means whereby when an echo signal above a predetermined strength is received a main counting operation is started and continued until reliable signals at the same range cease, means for initiating a compensating count immediately to follow the main count, which compensating count has a length bearing an inverse relationship to the main count and means whereby a backward angular correction is then made from the position at which the compensating count ends to determine the true angular position of the target in the arc swept during the counting operations.

2. Radar equipment including apparatus for transmitting pulses and receiving echo signals at successive angular positions over an angular sweep, means whereby when an echo signal above a predetermined strength is received a main counting operation at the recurrence rate of pulse transmission is started and continued until reliable signals at the same range cease, means for initiating a compensating count immediately to follow the main count which compensating count has a length bearing an inverse relationship to the main count and means whereby a backward angular correction is then made from the position at which the compensating count ends to determine the true angular position of the target in the arc swept during the counting operations.

3. Radar equipment including apparatus for transmitting pulses and receiving echo signals at successive angular positions over an angular sweep, means whereby when an echo signal above a predetermined strength is received a main counting operation at the recurrence rate of pulse transmission is started and continued until reliable signals at the same range cease, means for then halving the count, means whereby a compensating count immediately follows the main count which compensating count starts from the halved value of the main count and continues to a limiting value so as to have a length bearing an inverse relationship to the main count and means whereby a backward angular correction is then made from the position at which the compensating count ends to determine the true angular position of the target in the arc swept during the counting operations.

4. Radar equipment including apparatus for transmitting pulses and receiving echo signals at successive angular positions over an angular sweep, means whereby when an echo signal above a predetermined strength is received a main counting operation is started and continued until reliable signals at the same range cease, means for initiating a compensating count immediately to follow the main count which compensating count continues from the number reached by the main count but at a rate which is appreciably faster than the main count and means whereby a backward angular correction is then made from the position at which the compensating count ends to determine the true angular position of the target in the arc swept during the counting operations.

5. Radar equipment including apparatus for transmitting pulses and receiving echo signals at successive angular positions over an angular sweep, means whereby when an echo signal above a predetermined strength is received a main counting operation is started and continued until reliable signals at the same range cease, means for initiating a compensating count immediately to follow the main count, which compensating count continues from the number reached by the main count but counts two per trace and means whereby a backward angular correction is then made from the position at which the compensating count ends to determine the true angular position of the target in the arc swept during the counting operations.

6. Radar equipment including a stacked beam aerial rotatable about a vertical axis, apparatus for transmitting pulses and receiving echo signals on each beam at successive angular positions over an angular sweep, means whereby when an initial echo signal above a predetermined strength is received by any beam a main counting operation is started of signals at the same range as the beam receiving the initial signal and immediately adjacent beams and continued until reliable signals cease, means whereby a compensating count immediately follows the main count which compensating count has a length bearing an inverse relationship to the main count and means whereby a backward angular correction is then made to determine the true angular position of the target in the arc swept during the counting operations.

7. Radar equipment including a stacked beam aerial rotatable about a vertical axis, apparatus for transmitting pulses and receiving echo signals on each aerial beam at successive bearing positions over an angular sweep, storage means associated with each of a plurality of ranges, means for feeding an initial echo signal above a predetermined strength to a range store, means for adding succeeding signals on the same beam and at the same range, means whereby when signals cease a compensating count is made and means whereby at the end of the compensating count a backward adjustment is made in bearing to obtain the true bearing of the target.

8. Radar equipment including a stacked beam aerial rotatable about a vertical axis, apparatus for transmitting pulses and receiving echo pulses on each aerial beam at successive bearing positions over an angular sweep, counting means whereby when a signal is received on a beam successive signals on the same beam and at the same range are counted, means whereby signals on adjacent beams at the same range are individually counted, means whereby when signals in all three beams cease a compensating count is initiated which compensating count bears an inverse relationship to the main count and means for making a backward bearing adjustment from the end of the compensating count to obtain the true target bearing.

References Cited by the Examiner

UNITED STATES PATENTS 2,661,467 12/1953 Jones.

CHESTER L. JUSTUS, *Primary Examiner.*

RODNEY D. BENNETT, *Examiner.*